Aug. 31, 1965  T. F. NELSON  3,203,095
POWER-OPERATED KNIFE
Filed July 29, 1963  2 Sheets-Sheet 1
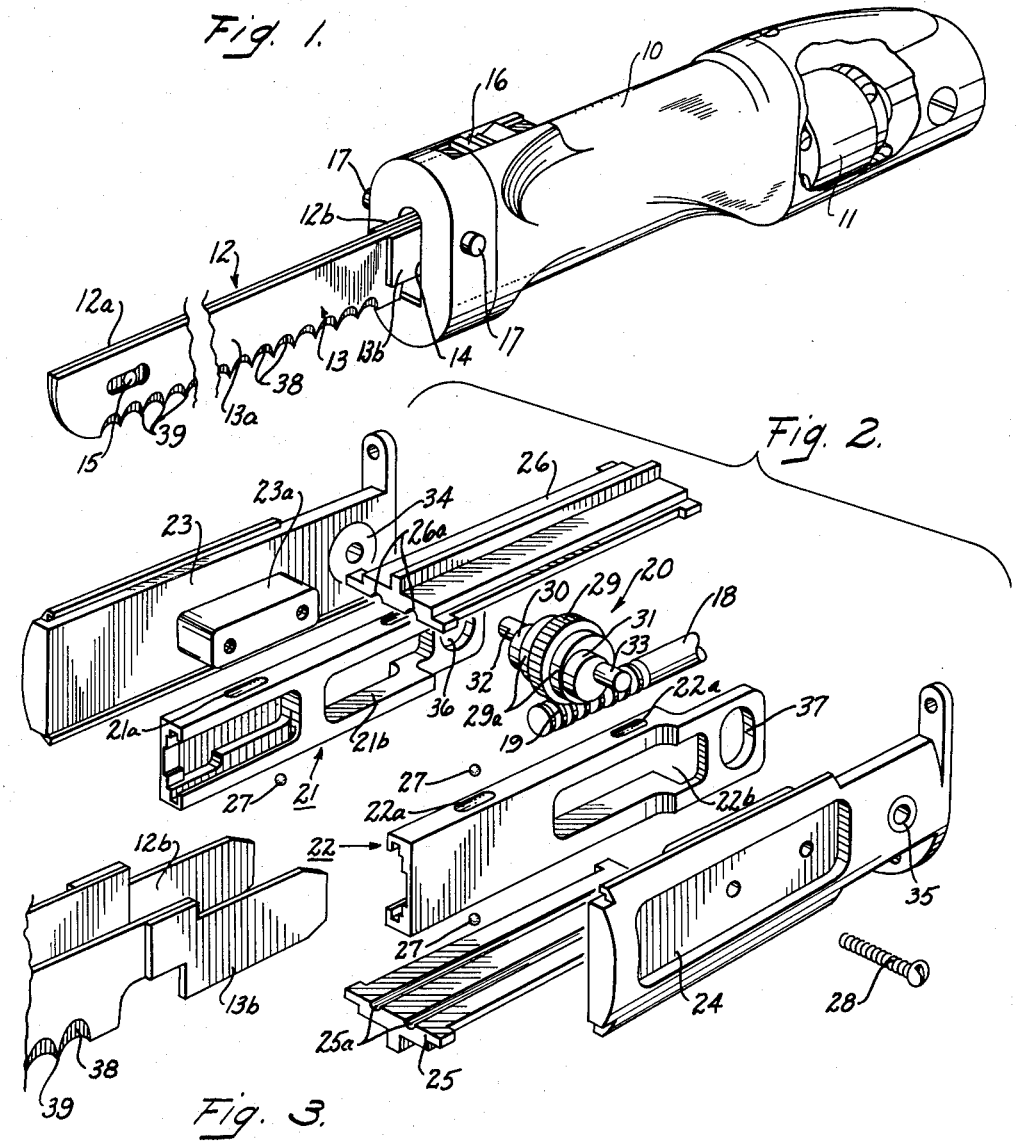
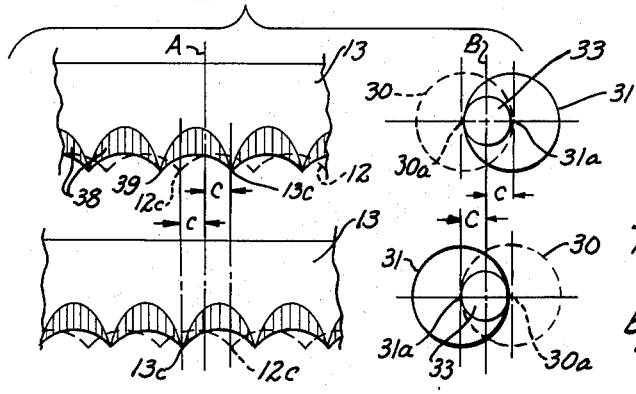
Inventor:
Thomas F. Nelson
by Leonard Platt
His Attorney Aug. 31, 1965  T. F. NELSON  3,203,095
POWER-OPERATED KNIFE
Filed July 29, 1963  2 Sheets-Sheet 2

Inventor:
Thomas F. Nelson
by Leonard J. Platt
His Attorney

United States Patent Office 3,203,095
Patented Aug. 31, 1965

3,203,095
POWER-OPERATED KNIFE
Thomas F. Nelson, Stratford, Conn., assignor to General Electric Company, a corporation of New York
Filed July 29, 1963, Ser. No. 298,301
7 Claims. (Cl. 30—272)

This invention relates to power-operated slicing knives, and in particular to such knives which are designed to be manually manipulated for accomplishing conventional food cutting chores.

Power-operated slicing devices, such as the electrically operated rotary blade machines, have long been conventional equipment in grocery stores, delicatessens, and the like. However, due to their bulkiness, lack of versatility, high initial cost and the danger of a rotary blade, such machines have proven unacceptable for normal household cutting chores.

Problems have also been encountered with power-operated hand-held knives designed for conventional domestic use. Such problems include, for example, the inability to satisfactorily slice a broad variety of foods when the foods are either cold or hot, and the inconvenience in cleaning the knife blades. A particular area of difficulty present to power-operated hand-held knives has been softer food items, such as bread, warm meats and particular vegetables, such as tomatoes, which are crushed by the blades of knives designed for slicing harder substances.

A further factor reducing the acceptability of prior power-operated slicing knives arises from the necessity, which is common to all knives, of cleansing the knife blades subsequent to each use. With power-operated knives, the cleansing of the knife blades may cause liquids or other foreign matter to enter the blade drive mechanism, resulting in the clogging of close tolerance rotary elements and deterioration of the drive mechanism and also providing another cleansing task. Furthermore, where the drive mechanism includes electrical apparatus, such as a motor, a shock hazard may exist.

Accordingly, it is one object of this invention to provide a hand-held power-operated slicing knife having an improved slicing action.

It is another object of this invention to provide such a knife which is readily capable of slicing a broad variety of food stuffs when either hot or cold with a clean even slicing action.

It is another object of this invention to provide a power-operated knife wherein the knife blades may be conveniently cleansed separately from the knife drive mechanism.

It is a still further object of this invention to provide cutting means for a power-operated knife which are removably secured to the knife drive mechanism through means which positively prevent the disengagement of the cutting means and the drive mechanism during use.

In carrying out the objects of this invention in one form thereof, a power-operated slicing knife is provided with a pair of counter-reciprocating blades, in intimate sliding contact with one another, having ground scalloping along the lower blade edges to provide a continuous shearing of the foods being sliced. The scalloping includes adjacent ground indentations which intersect to form downwardly extending peaks. The blade edge and the drive mechanism are arranged so that the stroke of the blades in opposite directions will be sufficient to insure that at least one peak on the edge of each blade passes at least one peak on the edge of the other blade. Thus, in addition to the continuous shearing by the counter-reciprocation of the ground scallop indentations, shearing is provided between the counter-reciprocating, contacting, blade peaks.

In accordance with another aspect of my invention means are provided on the knife blade and on a member of the drive mechanism to secure the knife blade to the drive member with lateral engagement. The rear portion of the knife blade is accommodated in channels formed in the drive member to firmly orient the knife blades and to prevent any relative vertical motion between the drive mechanism and the knife blades. The lateral engagement of the blade and the drive mechanism prevents disengagement thereof during operation wherein vertical stresses are placed on the knife blade resulting from the vertical downward stroke through the food being cut.

Other objects and advantages of my invention may best be understood by reference to the following description taken in connection with the accompanying drawings in which:

FIG. 1 is a perspective view of a power-operated slicing knife of this invention having a portion of the knife blades deleted for clarity and showing a portion of the drive housing cut away;

FIG. 2 is an exploded perspective view of the drive mechanism of the power-operated knife of FIG. 1 and of the rearward portions of the knife blades;

FIG. 3 is a diagrammatic representation of the relative position of the knife blades at extreme positions of the longitudinal stroke of the drive mechanism, showing the relative position of the eccentric drive mechanism at these positions;

Figure 4:
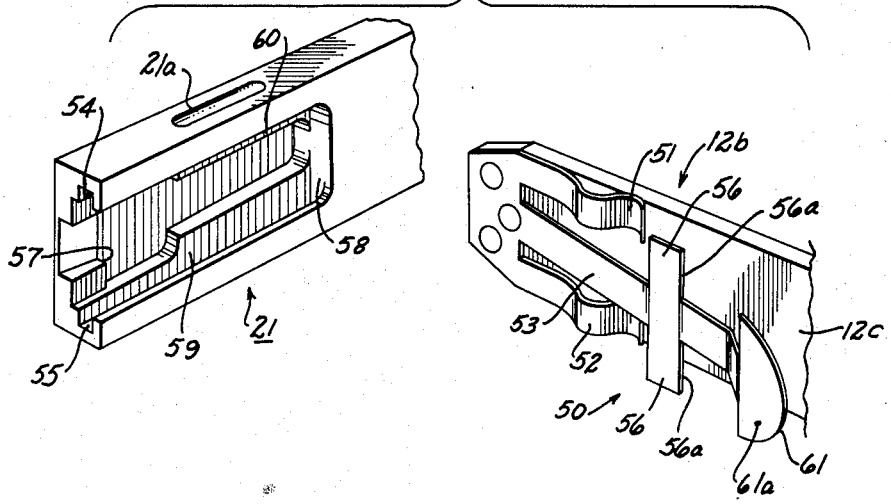
FIG. 4 is a perspective view of the forward portion of one driven member of the mechanism shown in FIG. 2 and of the rearward portion of one knife blade including a latch member adapted for engagement in the driven member.

Referring now to the drawings, FIG. 1 shows a hand-held power-operated slicing knife having a handle or housing 10, a motor 11 enclosed within rearward portion of the housing, and a pair of knife blades 12 and 13. The knife blades include forward cutting portions 12a and 13a which extend forwardly from the front end of housing 10 and rearward tang portions 12b and 13b which extend through a forward aperture 14 in the front end of the housing for connection to a drive mechanism within the housing. The knife blades are held in intimate sliding contact along their inner, substantially flat, side faces by any conventional fastening means, such as, keyhole slot and rivet arrangement 15. A switch button 16 is positioned on the top forward surface of housing 10 for controlling energization of motor 11. A pair of push buttons 17, to be discussed more fully hereinafter, extend laterally from opposite sides of the forward end of handle 10.

FIG. 2 reveals the elements of the unique drive mechanism of my knife which are enclosed in the central portion of housing 10 between motor 11 and the forward aperture 14. The mechanism is connected to a motor drive shaft 18 having a worm 19 formed on the forward end thereof and is adapted to receive tang portions 12b and 13b of the knife blades. The elements of the drive mechanism include a transmission or crank assembly 20 and a pair of connecting rods or members 21 and 22. These elements are movably supported in the housing by side frames 23 and 24, lower slide 25 and upper slide 26. The side frames and slides are firmly secured within housing 10 by any suitable fastening means.

Connecting rods 21 and 22 are longitudinally slidable between slides 25 and 26 by means of a plurality of small ball bearings, such as 27. The ball bearings are positioned between grooves 21a and 22a, formed in the upper and lower surfaces of connecting rods 21 and 22, and grooves 25a and 26a formed in the lower and upper slides 25 and 26. Laterally projecting guides are provided on the inner surfaces of the side frames as shown at 23a to pass through apertures 21b and 22b of the connecting rods to properly space the connecting rods within the housing. Fasteners such as shown at 28 pass through apertures in frame 24 and apertures 22b and 21b of the connecting rods for threaded engagement in frame guide 23a.

Crank assembly 20 which may comprise an integral unit includes a central gear 29 which meshes with worm 19, a pair of eccentrically formed circular cams 30 and 31, and a pair of journals or pins 32 and 33. Spacers 29a, which may be integrally formed with gear 29, position cams 30 and 31 the proper lateral distance from the gear. The crank assembly is supported within housing 10 for rotation about a fixed axis transverse to the axis of motor drive shaft 18, by bearings 34 and 35. Cams 30 and 31 are positioned on opposite sides of the rotative axis of the gear 29, diametrically opposed to one another, with their centers at equal predetermined throw distances from the axis. Crank assembly 20 is positioned between the rearward portions of connecting rods 21 and 22, with cams 30 and 31 located within elliptical apertures 36 and 37 of the connecting rods.

As cams 30 and 31 fit closely within elliptical apertures 36 and 37, it can be seen that upon rotation of crank assembly 20 the connecting rods are driven in short counter-reciprocating strokes.

The total travel or stroke distance of each connecting rod is equal to the total distance which the cam centers move longitudinally during the rotation of each cam from its forwardmost position to its rearwardmost position, i.e., two times the throw distance. This occurs during a one-half rotation of gear 29.

As will be discussed more fully hereinafter, the forward portions of connecting rods 21 and 22 are adapted for connection to the knife blades.

In accordance with one aspect of my invention, the lower edges of the knife blades are scalloped as shown in FIGS. 1–3 to provide a series of adjacent ground cusps or indentations 38 which achieve a unique continuous shearing action when used in a pair of abutting counter-reciprocating blades. Cusps 38 are separated by peaks or ridges 39 where the indentations intersect. Not only do peaks 39 of each blade provide independent cutting action upon their passing one another in close sliding contact, but the ground surfaces 38 between the peaks also insure a continuous shearing between the two oppositely moving blades along the entire length of the scalloped portion of the bades. Preferably cusps 38 are slightly concave.

Highly efficient slicing has been provided by the counter-reciprocating scalloped blades when the blade peaks are passing one another at a relatively high speed. Furthermore, it has been found that a rapid reversal of the shearing action of the blade edges is particularly desirable for the cutting of warm meats and other softer foods which have a tendency to "give" or move with the knife blades. Thus, a short reciprocating stroke has proven ideal. A short stroke drive mechanism also consumes less space within the knife housing where space limitations are critical and insures maximum utilization of the knife edges.

The following data relating to one specific embodiment of my invention which has proven satisfactory will best be understood when related to the elements shown in FIGS. 2 and 3. Using a motor and gear arrangement to provide a rotation of gear 29 at a rate of approximately 2,000 revolutions per minute and having cams 30 and 31 positioned with their center point 3/32 of an inch from the axis of gear 29, satisfactory slicing of a broad range of foods has been achieved with scalloped bades having a peak to peak dimension of one-quarter inch. The throw distance of 3/32 inch provides a stroke length of 3/16 inch. I have found that a stroke length substantially greater than this dimension tends to throw or force the food being cut from the plate or table on which it is being cut.

FIG. 3 represents a diagrammatic side view of crank assembly 20, showing only pin 33, cam 31 and blade 13 in solid lines, and cam 30 and blade 12 in broken lines, when the crank assembly is positioned to place the cams and the knife blades in their extreme forward and rearward positions. Line A represents the point at which the scalloping peaks 12c and 13c would pass or laterally coincide with one another, at which time the cams would be in their uppermost and lowermost or neutral positions. Line B is a vertical line through the axis of rotation of crank assembly 20, and 30a and 31a represent the center points of cams 30 and 31 respectively. The upper diagram of FIG. 3 shows blade 13 in its rearwardmost position and the corresponding position of cam 31 while the lower diagram shows blade 13 in its forwardmost position and the corresponding position of cam 31. The opposite extreme positions of blade 12 and cam 30 are shown in FIG. 3 in broken lines.

It can be seen that the application of rotative force to cam 31 will begin to drive blade 13 from its rearwardmost position forwardly. Upon the rotation of cam 31 to a position displaced 90°, from the position shown in the upper portion of FIG. 3, so that the cam center is on line B the blades will be in their neutral position in which the blade peaks coincide laterally as peaks 12c and 13c do along line A. At this point, blade 13 and the center of cam 31 will have moved forwardly from their rearwardmost positions to their neutral positions, a distance C. As cam 31 moves 90° more, to the position shown in the lower diagram of FIG. 3, blade 13 continues to its forwardmost position the scalloping peaks having passed one another so that the peaks are now spaced by two times the distance C or 3/16 inch and blade 13 is ready to commence its rearward motion. As is clear from the diagrams of FIG. 3, the movement of the blade peaks a distance C results from the movement of the centers of the cams an equal distance.

From this analysis it is clear that each peak on blade 13 passes only one corresponding peak on blade 12 during each forward stroke and each rearward stroke. Corresponding peaks will pass one another twice in each full revolution or cycle of the crank assembly, each blade making two strokes during each revolution. It will be understood that by decreasing the peak to peak dimension of the scalloping on the knife blades, the amount of peak to peak by-passes during each stroke may be increased correspondingly. However, if the peak to peak dimension of the blade scalloping is increased, it may not be increased beyond a dimension twice that of the stroke distance if the blades are oriented, when in their neutral positions, with the peaks of one blade medially located between the peaks of the other blade; this is so if the scalloping peaks are to pass corresponding peaks on the other blade. It may be computed, based on the given dimensions for the preferred embodiment, that approximately 16,000 independent shears per inch take place along the scalloped length of the knife blades between oppositely reciprocating scallop peaks.

Turning now to another aspect of my invention, unique means are provided by which the knife blades are removably secured to the knife drive members. FIG. 4 shows the forward portion of connecting rod 21 and the rearward tang portion 12b of blade 12, having a lateral member or latch 50 secured to the rearward end thereof. Latch 50, preferably of resilient metal, includes an integrally formed pair of longitudinally extending legs 51 and 52 and a central elongated spring member or arm 53. The forward end of both connecting rods 21 and 22 are similarly adapted to receive the rearward ends of the knife blades 12 and 13, blade 13 having a latch identical to latch 50 secured to its rearward tang portion 13b.

Connecting rod 21 includes upper and lower integrally formed channels 54 and 55 which are adapted for sliding receipt of the rearward portion 12b of blade 12. These channels serve to properly position the blade in the drive mechanism and to prevent relative vertical and lateral motion between the connecting rod 21 and blade 12. To positively connect the blade and the connecting rod and to prevent relative longitudinal movement therebetween when the members are connected, projections 56 formed on spring arm 53 are adapted to be engaged or locked behind vertical surfaces such as 57 formed adjacent the forward end of the connecting rod. The normal outward bias of spring arm 53 is sufficient to hold projections 56 behind surfaces 57 when the blade is slid into channels 54 and 55 to prevent the forward relative motion of the blade with respect to the connecting rod.

In order to secure blade 12 in connecting rod 21 longitudinally the knife blade must also be prevented from rearward motion relative to the connecting rod. Such rearward motion is prevented by the dimensioning of channels 54 and 55 so that a rearward wall or surface 58 is spaced from vertical surfaces 57 a distance slightly greater than the longitudinal distance from the forward edges 56a of projections 56 to the rearward end of the knife blade tang. As the blade is inserted and pushed rearwardly into the connecting rod, spring arm 53 is pressed inwardly toward the outer face 12c of the knife blade until projection 56 is aligned behind surface 57 at which time it snaps or deflects outwardly under its normal bias to achieve the desired engagement.

Figure 5:
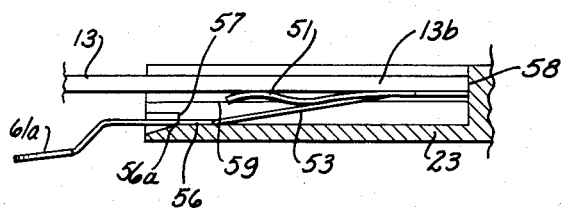
FIG. 5 is a plan view in partial section showing the engagement of a knife blade and a driven member.

The function of spring legs 51 and 52 of latch 50 is shown in FIG. 5. Here, the latch 50 connected to blade 13 is shown in engagement with connecting rod 22. As blade 13 is pushed into connecting rod 22, legs 51 and 52 slide with the blade into the upper and lower channels respectively. The latch legs are arcuately formed and become compressed between the outer surface of blade 13 and vertical wall 59 of the connecting rod. This compression applies a resilient biasing force laterally against blade 13 to insure intimate sliding contact between blades 12 and 13.

Figure 6:
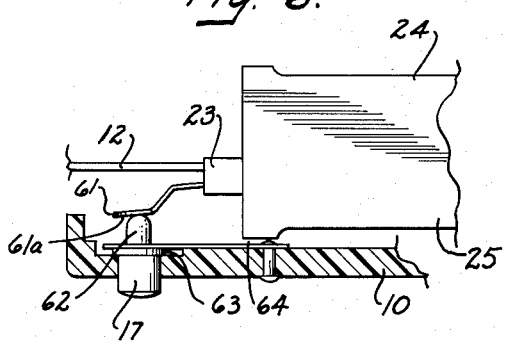
FIG. 6 is a plan view in partial section showing means for releasing the latch member from the drive mechanism.

In accordance with the preferred form of my invention, the latches are designed so that it is merely necessary to press the latch spring arm 53 inwardly toward the knife blades thereby releasing the projections 56 from vertical surfaces 57 to release the knife blades from their respective connecting rods. FIG. 6 shows the preferable external means by which the latches may be released, by manual operation from their connecting rods.

A bearing element 61 is integrally formed with spring arm 53 on the free end thereof. When the knife blade is properly positioned in the connecting rod, the outer surface 61a rides against inner projection 62 of push button 17 which passes through the forward portion of housing 10. The bias of spring arm 53 presses bearing element 61 and push button 17 outwardly, a flange 63 on the push button serving to limit this outward movement. A lightweight leaf spring 64 serves to hold the push button outwardly when no blades are held by the connecting rods. It can be seen that the inward manual operation of push button 17 releases latches 50 from engagement with the connecting rods. The blades may then be removed from the connecting rods merely by pulling forward on them so as to withdraw the blade tangs through aperture 14.

My invention, therefore, provides a power-operated slicing knife which may be hand-held by the user for convenient slicing of a broad range of foodstuffs. Such a capability is made possible through the use of a pair of counter-reciprocating blades having a plurality of ground scallops on their lower edges. Such blades, when driven with short rapid strokes, have been found particularly efficient. Furthermore, my invention provides suitable manually-operated means for attaching and detaching the knife blades and the drive mechanism to permit separate cleansing of the knife blades without danger to the drive mechanism from foreign matter or liquids coming in contact therewith.

Furthermore, the lateral engagement of the knife blade latches with the connecting rods is most suitable for a power-operated slicing knife. In such knives the knife blades undergo vertical forces when being pressed downwardly through various foods. Due to the lateral engaging means of my knife there is no danger that during operation the connection between the blades and the drive mechanism can be broken by such downward pressure. The channels formed in the connecting rods provide for accurate positioning as well as holding of the knife blades. The push button operated release of the knife blades permits convenient safe means for separating the blades from the knife drive for regular cleaning of the blades.

It is to be understood that the particular construction described herein is by way of example only and it is the aim of the appended claims to cover all such equivalent variations as come within the true spirit and scope of the foregoing disclosure.

What I claim is:
1. An electrically operated slicing knife comprising:
    (a) a housing;
    (b) an electrical motor mounted in said housing;
    (c) transmission means in said housing connected to said motor;
    (d) a pair of driven members connected to said transmission means for opposite reciprocating motion with respect to one another when said motor is energized;
    (e) a guide channel in each of said members;
    (f) a pair of blade members each having a vertical side face, said faces being in intimate sliding contact with one another;
    (g) each of said blade members having a cutting portion and a tang, the tang of each blade member being complementary with the channel of one of said driven members for vertical reception therein to provide two reciprocating units;
    (h) a resilient element secured to one member of each reciprocating unit; and
    (i) means on the other member of each of said units for laterally engaging said resilient element of said one member to secure said blade members to said driven members.

2. An electrically operated slicing knife comprising:
    (a) a hollow housing;
    (b) drive means including an electrical motor within said housing;
    (c) a driven member mounted within said housing and connected to said drive means for reciprocating motion when said drive means is energized;
    (d) a longitudinal guide channel in said member including spaced vertical surfaces;
    (e) a blade having a cutting portion extending forwardly from said housing and a tang portion extending into said housing and complementary with said channel for reception therein;
    (f) a resilient latch element secured to said tang portion;
    (g) means on said driven member for laterally engaging said resilient element to secure said blade to said driven member when said blade is inserted in said channel; and
    (h) means extending through said housing and enengageable with said resilient element for releasing said element from said laterally engaging means on said driven member to release said blade from said driven member.

3. A power-operated slicing knife recited in claim 2 wherein said releasing means includes a pushbutton which extends laterally through one side of said housing.

4. A power operated slicing knife comprising:
 (a) an elongated housing;
 (b) drive means adapted to be connected to a source of power;
 (c) a pair of driven members slidably mounted within said housing;
 (d) means connected to said drive means and to said members for driving said members with counter-reciprocating strokes of approximately 3/16" in length and at the rate of approximately 4,000 strokes per minute;
 (e) a pair of knife blades extending forwardly from said housing, each of said blades including a forward cutting portion, a rearward tang portion, and a substantially flat side face;
 (f) said side faces being in sliding contact with one another along the length of said cutting portions;
 (g) said rearward tang portions being releasably connected to said members;
 (h) a series of adjacent arcuate ground indentations formed on the lower edge of the cutting portions of each of said blades, said indentations intersecting at downwardly extending peaks; and
 (i) said blade peaks being so spaced that the peaks of one blade pass at least one corresponding peak of the other blade when said drive means is operated.

5. A power operated slicing knife comprising:
 (a) an elongated housing;
 (b) drive means adapted to be connected to a source of power;
 (c) a pair of driven members slidably mounted within said housing;
 (d) means connected to said drive means and to said members for driving said members with counter-reciprocating strokes of approximately 3/16" in length and at a rate of approximately 4,000 strokes per minute;
 (e) a pair of knife blades extending forwardly from said housing, each of said blades including a forward cutting portion, a rearward tang portion, and a substantially flat side face;
 (f) said side faces being in sliding contact with one another along the length of said cutting portions;
 (g) said rearward tang portions being releasably connected to said members; and
 (h) a series of adjacent scallops formed on the lower edge of the cutting portions of each of said blades, said scallops being spaced so that each of the lowermost points of the scallops of one blade pass a corresponding point of the other blade when said drive means is operated.

6. A power operated slicing knife comprising:
 (a) a support;
 (b) drive means secured to said support and adapted to be connected to a source of power;
 (c) a pair of knife blades including a cutting portion and a substantially flat side face;
 (d) means for holding said side faces in sliding contact with one another along the length of said cutting portions;
 (e) means connecting said knife blades to said drive means for reciprocating said blades in opposite directions through a stroke approximately 3/16" in length and at a rate of approximately 4,000 strokes per minute per blade; and
 (f) a series of adjacent ground indentations formed on the lower edge of the cutting portions of each of said blades, said indentations intersecting at downwardly extending peaks.

7. A power-operated slicing knife comprising:
 (a) a housing;
 (b) drive means in said housing;
 (c) at least one driven member connected to said drive means for longitudinal reciprocation when said drive means is energized;
 (d) longitudinal guide channel means formed in said driven member including:
  (aa) an upper channel having an upper horizontal surface and depending closely spaced side surfaces; and
  (bb) a lower channel having a lower horizontal surface spaced from said upper horizontal surface and upstanding closely spaced side surfaces vertically oriented with said upper channel side surfaces;
 (e) a blade member having a cutting portion and a flat vertically oriented tang portion, said tang portion being snugly received within said upper and lower channels, said horizontal surfaces preventing relative vertical motion between said tang portion and said driven member, and said side surfaces preventing relative lateral movement between said tang portion and said driven member;
 (f) said driven member further including a rear vertical surface adjacent one end of said channels engaging the end of said tang portion to limit the rearward movement of said tang portion into said driven member;
 (g) a resilient spring arm having one end secured to one of said members and a free end normally biased laterally toward the other of said members, engaging means on said spring arm;
 (h) laterally extending means formed on said other member for engagement with said engaging means to prevent forward movement of said blade tang portion relative to said driven member, whereby said blade member is secured to said driven member for reciprocation therewith; and
 (i) means formed on said spring arm for manually moving the arm laterally to release the arm from said other member so that said tang portion may be forwardly withdrawn from said driven member.

References Cited by the Examiner

UNITED STATES PATENTS

| | | | |
|---|---|---|---|
| 174,417 | 3/76 | Evans | 30—162 |
| 1,331,842 | 2/20 | Carey | 30—222 X |
| 1,833,246 | 11/31 | Finocchiaro | 30—216 X |
| 1,837,655 | 12/31 | Craft | 30—216 |
| 1,890,506 | 12/32 | Frank et al. | 30—162 X |
| 2,005,862 | 6/35 | Johnsen | 30—216 |
| 2,168,703 | 8/39 | Dziedzic et al. | 30—173 |
| 2,380,787 | 7/45 | Pierce et al. | 30—220 |
| 2,623,283 | 12/52 | Godfrey et al. | 30—216 |
| 2,630,628 | 3/53 | Hall | 30—220 X |
| 2,781,578 | 2/57 | Guilfoyle | 30—272 |
| 2,825,968 | 3/58 | Baer | 30—355 |
| 2,945,298 | 7/60 | Guttmann | 30—272 |
| 2,979,820 | 4/61 | Thompson | 30—215 |
| 3,014,276 | 12/61 | Prohaska | 30—272 |

WILLIAM FELDMAN, *Primary Examiner.*

MILTON S. MEHR, *Examiner.*